(12) United States Patent
Feyereisen et al.

(10) Patent No.: US 7,917,289 B2
(45) Date of Patent: *Mar. 29, 2011

(54) PERSPECTIVE VIEW PRIMARY FLIGHT DISPLAY SYSTEM AND METHOD WITH RANGE LINES

(75) Inventors: Thea L. Feyereisen, Hudson, WI (US); Gang He, Morristown, NJ (US); Sandy Wyatt, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 741 days.

This patent is subject to a terminal disclaimer.

(21) Appl. No.: 11/929,027

(22) Filed: Oct. 30, 2007

(65) Prior Publication Data

US 2010/0070176 A1   Mar. 18, 2010

(51) Int. Cl.
G08G 5/04 (2006.01)
G01C 23/00 (2006.01)
(52) U.S. Cl. .......................................... 701/211; 701/3
(58) Field of Classification Search .................. None
See application file for complete search history.

(56) References Cited

U.S. PATENT DOCUMENTS

| | | |
|---|---|---|
| 3,896,432 A | 7/1975 | Young |
| 4,660,157 A | 4/1987 | Beckwith et al. |
| 5,339,085 A | 8/1994 | Katoh et al. |
| 5,920,276 A | 7/1999 | Frederick |
| 5,936,552 A | 8/1999 | Wichgers et al. |
| 5,995,903 A | 11/1999 | Smith et al. |
| 6,092,009 A | 7/2000 | Glover |
| 6,208,933 B1 | 3/2001 | Lazar |
| 6,591,171 B1 | 7/2003 | Ammar et al. |
| 6,653,947 B2 | 11/2003 | Dwyer et al. |
| 6,771,207 B1 | 8/2004 | Lang |
| 6,782,312 B2 | 8/2004 | He |
| 7,098,809 B2 | 8/2006 | Feyereisen et al. |
| 7,191,056 B2 | 3/2007 | Costello et al. |
| 7,209,070 B2 | 4/2007 | Gilliland et al. |

(Continued)

FOREIGN PATENT DOCUMENTS

EP   0750238 A1   12/1996

OTHER PUBLICATIONS

European Search Report for Application No. EP 08 16 7576, dated Feb. 24, 2009.
European Decision of the Examining Division for EP 08167576.1 dated Jun. 30, 2010.

*Primary Examiner* — Michael J. Zanelli
(74) *Attorney, Agent, or Firm* — Ingrassia Fisher & Lorenz, P.c.

(57) ABSTRACT

A display system for a vehicle includes a navigation database storing navigation data; a terrain sensor configured to gather terrain data; a processor adapted to receive the navigation data and the terrain data and operable to supply one or more image rendering display commands based upon the navigation data and the terrain data; and a display device. The display device is coupled to receive the image rendering display commands and operable, in response thereto, to render (i) a perspective view image representative of the terrain data and the navigation data and including terrain and (ii) at least one line on the perspective view image that extends at least partially across the terrain and represents at least one of a ground-referenced range to a fixed location on the terrain and a vehicle-referenced range from the vehicle to a fixed range away from the vehicle.

20 Claims, 2 Drawing Sheets

U.S. PATENT DOCUMENTS

| | | |
|---|---|---|
| 7,212,216 B2 | 5/2007 | He et al. |
| 7,262,713 B1 | 8/2007 | Vogl et al. |
| 7,463,954 B1 * | 12/2008 | He .................................... 701/3 |
| 7,609,200 B1 * | 10/2009 | Woodell et al. ............... 342/176 |
| 7,675,461 B1 * | 3/2010 | McCusker et al. ............ 342/179 |
| 2004/0239529 A1 | 12/2004 | Tran |
| 2007/0002078 A1 | 1/2007 | He et al. |
| 2007/0168120 A1 | 7/2007 | Vandenbergh et al. |

* cited by examiner

PERSPECTIVE VIEW PRIMARY FLIGHT DISPLAY SYSTEM AND METHOD WITH RANGE LINES

TECHNICAL FIELD

The present invention relates to a display for a vehicle and, more particularly, to a system and method for displaying information in a forward-looking perspective display.

BACKGROUND

Modern multifunctional map displays, particularly those used in vehicles such as aircraft, watercraft, or spacecraft, display a considerable amount of information, such as vehicle position, attitude, navigation, target, and terrain information. In the case of an aircraft, most modern displays additionally display a flight plan from different views, either a lateral view, a vertical view, or a perspective view, which can be displayed individually or simultaneously on the same display.

The lateral view, generally known as a lateral map display, is basically a top-view of the flight plan, and may include, for example, a top-view aircraft symbol, waypoint symbols, line segments that interconnect the waypoint symbols, and range rings. The lateral map may also include various map features including, for example, weather information, terrain information, political boundaries, and navigation aids. The terrain information may include situational awareness (SA) terrain, as well as terrain cautions and warnings which, among other things, may indicate terrain that may impact the aircraft. The perspective view provides a three-dimensional view of the vehicle flight plan and may include one or more of the above-mentioned features that are displayed on the lateral map, including the terrain information.

Some conventional displays may suffer certain drawbacks. For example, in some instances, the display may not provide sufficient information for an operator to determine a distance between the aircraft and a point or an object on the terrain. Consequently, the object may mistakenly appear too close to or too far away from the aircraft. In other instances, a three-dimensional translucent plane having a fixed range with respect to a current position of the aircraft is provided on top of terrain and into a flight space. In these cases, the planes intrude into the visual space of the display, are always shown in the display, and may obstruct the operator's view of other information on the same display. Other conventional displays may only display terrain and other features based on data from databases that may not have the most up-to-date terrain information.

Accordingly, it is desirable to provide a display system and method that addresses one or more of the above-noted drawbacks. In addition, it is desirable to provide a display system and method that accurately displays the distance of objects based on real-time data in the perspective view terrain relative to the aircraft without obstructing an operator's view of other information that may be on the same display. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with one exemplary embodiment, a display system for a vehicle is provided. The system includes a navigation database storing navigation data; a terrain sensor configured to gather terrain data; a processor adapted to receive the navigation data and the terrain data and operable to supply one or more image rendering display commands based upon the navigation data and the terrain data; and a display device. The display device is coupled to receive the image rendering display commands and operable, in response thereto, to render (i) a perspective view image representative of the terrain data and the navigation data and including terrain and (ii) at least one line on the perspective view image that extends at least partially across the terrain and represents at least one of a ground-referenced range to a fixed location on the terrain and a vehicle-referenced range from the vehicle to a fixed range away from the vehicle. The processor is configured to selectively display at least one of the ground-referenced range and the vehicle-referenced range.

In accordance with another exemplary embodiment, a display system for a vehicle is provided. The system includes a processor adapted to receive terrain data from a terrain sensor and navigation data from a navigation database, and operable, in response thereto, to supply one or more image rendering display commands. A display device is coupled to the processor to receive the image rendering display commands and operable, in response thereto, to simultaneously render (i) a perspective view image representative of the terrain data and the navigation data and (ii) one or more terrain-tracing lines or surface shapes. The perspective view image includes terrain having a profile that is determined by elevations of the terrain. Each terrain-tracing line or surface shape (i) extends at least partially across the terrain, (ii) represents a range from the vehicle to a location on the terrain, (iii) conforms with the terrain profile, (iv) has a configuration, wherein the configuration is selected from the group consisting of at least solid, dashed, opaque, semi-transparent, thick, thin, shaded, and colored, and (v) comprises a first segment and a second segment. The first segment has a first configuration and the second segment has a second configuration.

In accordance with yet another exemplary embodiment, a method is provided for displaying terrain on an aircraft flight deck display system. The method includes gathering terrain data with a terrain sensor; processing the terrain data; processing navigation data from a navigation database; and simultaneously displaying (i) a three-dimensional perspective view image representative of the terrain data and navigation data and (ii) at least one range line. The perspective view image includes the image terrain having a profile determined by elevations of the terrain. The range line (i) extends at least partially across the terrain, and (ii) represents at least one of a ground-referenced range to a fixed location on the terrain and a vehicle-referenced range from the vehicle to a fixed range away from the vehicle. The method further includes selectively displaying at least one of the ground-referenced range and the vehicle-referenced range.

BRIEF DESCRIPTION OF THE DRAWINGS

The present invention will hereinafter be described in conjunction with the appended drawing figures, wherein like numerals denote like elements, and in which.

DETAILED DESCRIPTION

Figure 1:
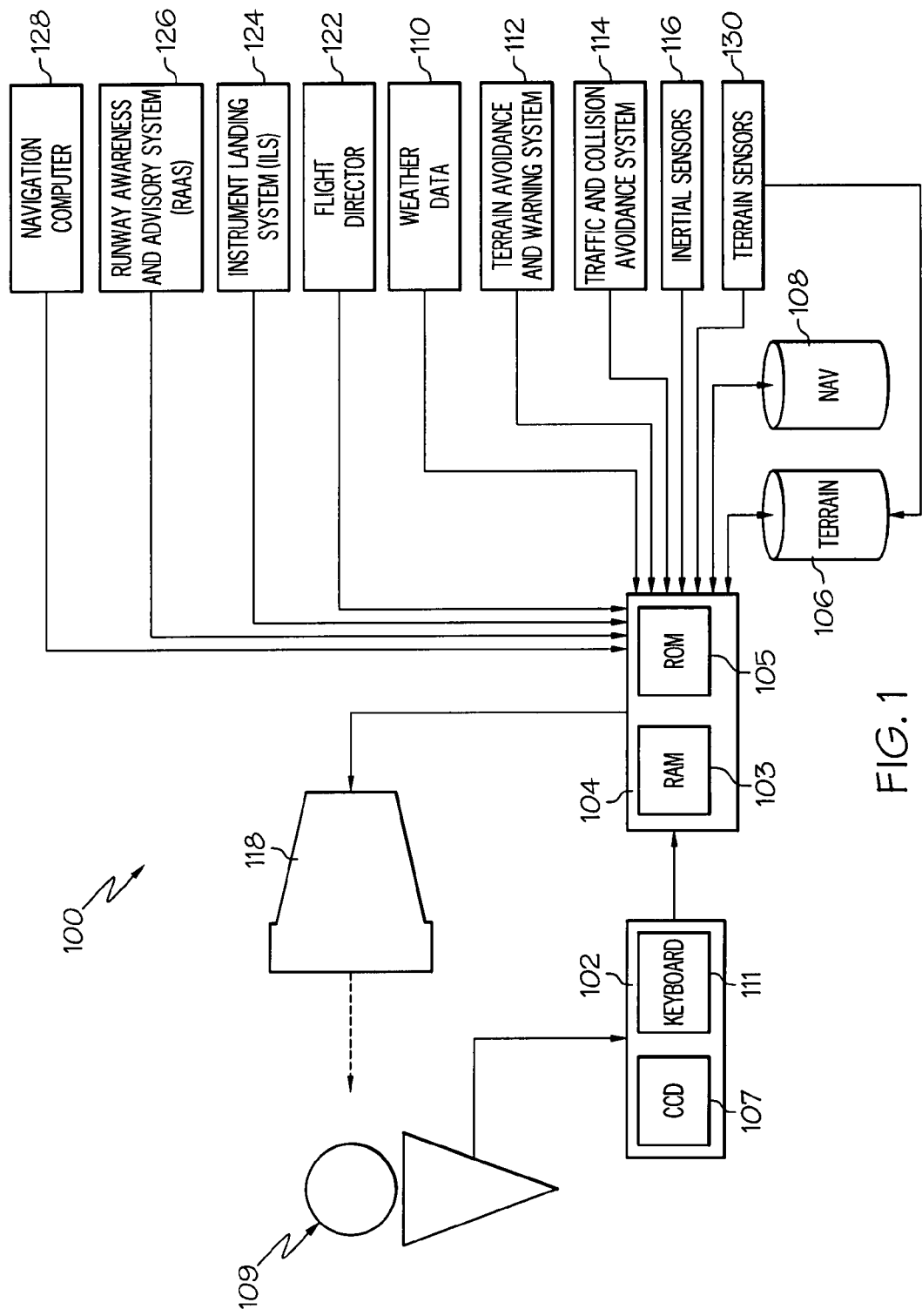
FIG. 1 is a functional block diagram of a flight deck display system according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Additionally, although the invention is described below as being implemented in aircraft, it will be appreciated that any other manned or unmanned vehicles, such as watercraft and spacecraft may alternatively incorporate the invention.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing, figures, or the specification are not to be construed as limiting the order in which the individual processing steps may be performed. It should be appreciated that the particular implementations shown and described herein are illustrative of the invention and its best mode and are not intended to otherwise limit the scope of the invention in any way.

Embodiments described herein provide a perspective view, primary flight display system and method with range lines. Particularly, the system and method described below provide the perspective view based on data from terrain sensors that gather the most up-to-date terrain information. The terrain information can then be enhanced, for example, by range lines that provide distance and/or time information, and displayed on the primary flight display.

Turning now to the description, and with reference to FIG. 1, an exemplary flight deck display system will be described. The system 100 includes a user interface 102, a processor 104, one or more terrain databases 106, one or more navigation databases 108, a source of weather data 110, a terrain avoidance and warning system (TAWS) 112, a traffic and collision avoidance system (TCAS) 114, one or more inertial sensors 116, one or more terrain sensors 130 and a display device 118. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 is in operable communication with the terrain database 106, the navigation database 108, and the display device 118, and is coupled to receive various types of inertial data from the inertial sensors 116, terrain data from the terrain sensor 130, and various other avionics-related data from one or more other external systems, which are briefly described further below.

The processor 104 is configured, in response to the inertial data, to selectively retrieve terrain data from the terrain database 106 or terrain sensor 130 and navigation data from the navigation database 108, and to supply appropriate display commands to the display device 118, so that the retrieved terrain and navigation data are appropriately displayed on the display device 118.

As FIG. 1 additionally shows, the processor 104 is also in operable communication with the source of weather data 110, the TAWS 112, the TCAS 114, and is additionally configured to supply appropriate display commands to the display device 118 so that the avionics data, weather data 110, data from the TAWS 112, data from the TCAS 114, and data from the previously mentioned external systems may also be selectively displayed on the display device 118. The data from the TCAS 114 can include Automatic Dependent Surveillance Broadcast (ADS-B) messages. The preferred manner in which the terrain and navigation data are displayed on the display will be described in more detail further below. Before doing so, however, a brief description of the processor 104, the display device 118, and data sources such as the databases 106, 108, the terrain sensor 130, the TCAS 114, the TAWS 112, and weather data 110, at least in the depicted embodiment, will be provided.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

The terrain database 106 includes various types of data, including elevation data, representative of the terrain over which the aircraft is flying. The data in the terrain database 106 can be pre-loaded by external data sources or provided in real-time by the terrain sensor 130. The terrain sensor 130 provides real-time terrain data to the processor 104 and/or the terrain database 106. In one embodiment, terrain data from the terrain sensor 130 is used to populate all or part of the terrain database 106, while in another embodiment, the terrain sensor 130 provides information directly, or through components other than the terrain database 106, to the processor 104.

In another embodiment, the terrain sensor 130 can include visible, low-light TV, infrared, lidar, or radar-type sensors that collect and/or process terrain data. For example, the terrain sensor 130 can be a radar sensor that transmits radar pulses and receives reflected echoes, which can be amplified to generate a radar signal. The radar signals can then be processed to generate three-dimensional orthogonal coordinate information having a horizontal coordinate, vertical coordinate, and depth or elevation coordinate. The coordinate information can be stored in the terrain database 106 or processed for display on the display device 118.

In one embodiment, the terrain data provided to the processor 104 is a combination of data from the terrain database 106 and the terrain sensor 130. For example, the processor 104 can be programmed to retrieve certain types of terrain data from the terrain database 106 and other certain types of terrain data from the terrain sensor 130. In one embodiment, terrain data retrieved from the terrain sensor 130 can include moveable terrain, such as mobile buildings and systems. This type of terrain data is better suited for the terrain sensor 130 to provide the most up-to-date data available. For example, types of information such as waterbody information and geopolitical boundaries can be provided by the terrain database 106. When the terrain sensor 130 detects, for example, a waterbody, the existence of such can be confirmed by the terrain database 106 and rendered in a particular color such as blue by the processor 104.

The navigation database 108 includes various types of navigation-related data. The navigation-related data include various flight plan related data such as, for example, waypoints, distances between waypoints, track between waypoints, data related to different airports, navigational aids, obstructions, special use airspace, political boundaries, communication frequencies, and aircraft approach information. In one embodiment, combinations of navigation-related data and terrain data can be displayed. For example, terrain data gathered by the terrain sensor 130 and/or terrain database 106 can be displayed with navigation data such as waypoints, airports, etc. from the navigation database 108, superimposed thereon.

Although the terrain database 106 and the navigation database 108 are, for clarity and convenience, shown as being stored separate from the processor 104, all or portions of either or both of these databases 106, 108 could be loaded into the on-board RAM 103, or integrally formed as part of the processor 104, and/or RAM 103, and/or ROM 105. The terrain database 106 and navigation database 108 could also be part of a device or system that is physically separate from the display system 100.

The avionics data that is supplied from the inertial sensors 116 includes data representative of the state of the aircraft such as, for example, aircraft speed, altitude, and heading. The inertial sensors 116 can include MEMS-based, ADHRS-related, or any other type of inertial sensor. The weather data 110 supplied to the processor 104 is representative of at least the location and type of various weather cells. The data supplied from the TCAS 114 includes data representative of other aircraft in the vicinity, which may include, for example, speed, direction, altitude, and altitude trend. In a preferred embodiment, the processor 104, in response to the TCAS data, supplies appropriate display commands to the display device 118 such that a graphic representation of each aircraft in the vicinity is displayed on the display device 118. The TAWS 112 supplies data representative of the location of terrain that may be a threat to the aircraft. The processor 104, in response to the TAWS data, preferably supplies appropriate display commands to the display device 118 such that the potential threat terrain is displayed in various colors depending on the level of threat. For example, red is used for warnings (immediate danger), yellow is used for cautions (possible danger), and green is used for terrain that is not a threat. It will be appreciated that these colors and number of threat levels are merely exemplary, and that other colors and different numbers of threat levels can be provided as a matter of choice.

As was previously alluded to, one or more other external systems (or subsystems) may also provide avionics-related data to the processor 104 for display on the display device 118. In the depicted embodiment, these external systems include a flight director 122, an instrument landing system (ILS) 124, a runway awareness and advisory system (RAAS) 126, and a navigation computer 128. The flight director 122, as is generally known, supplies command data representative of commands for piloting the aircraft in response to flight crew entered data, or various inertial and avionics data received from external systems. The command data supplied by the flight director 122 may be supplied to the processor 104 and displayed on the display device 118 for use by the user 109, or the data may be supplied to an autopilot (not illustrated). The autopilot, in turn, produces appropriate control signals that cause the aircraft to fly in accordance with the flight crew entered data, or the inertial and avionics data.

The ILS 124 is a radio navigation system that provides aircraft with horizontal and vertical guidance just before and during landing and, at certain fixed points, indicates the distance to the reference point of landing. The system includes ground-based transmitters (not shown) that transmit radio frequency signals. The ILS 124 on board the aircraft receives these signals and supplies appropriate data to the processor for display of, for example, an ILS feather (not shown in FIG. 1) on the display device 118. The ILS feather represents two signals, a localizer signal that is used to provide lateral guidance, and a glide slope signal that is used for vertical guidance.

The RAAS 126 provides improved situational awareness to help lower the probability of runway incursions by providing timely aural advisories to the flight crew during taxi, takeoff, final approach, landing and rollout. The RAAS 126 uses GPS data to determine aircraft position and compares aircraft position to airport location data stored in the navigation database 108. Based on these comparisons, the RAAS 126, if necessary, issues appropriate aural advisories. The aural advisories the RAAS 126 may issue inform the user 109, among other things of when the aircraft is approaching a runway, either on the ground or from the air at times such as when the aircraft has entered and is aligned with a runway, when the runway is not long enough for the particular aircraft, the distance remaining to the end of the runway as the aircraft is landing or during a rejected takeoff, when the user 109 inadvertently begins to take off from a taxiway, and when an aircraft has been immobile on a runway for an extended time. During approach, data from sources such as GPS, including RNP and RNAV, can also be considered.

The navigation computer 128 is used, among other things, to allow the user 109 to program a flight plan from one destination to another. The navigation computer 128 may be in operable communication with the flight director 122. As was mentioned above, the flight director 122 may be used to automatically fly, or assist the user 109 in flying, the programmed route. The navigation computer 128 is in operable communication with various databases including, for example, the terrain database 106, and the navigation database 108. The processor 104 may receive the programmed flight plan data from the navigation computer 128 and cause programmed flight plan, or at least portions thereof, to be displayed on the display device 118.

The display device 118 is used to display various images and data, in both a graphical and a textual format, and to supply visual feedback to the user 109 in response to the user input commands supplied by the user 109 to the user interface 102. It will be appreciated that the display device 118 may be any one of numerous known displays suitable for rendering image and/or text data in a format viewable by the user 109. Non-limiting examples of such displays include various cathode ray tube (CRT) displays, and various flat panel displays such as, various types of LCD (liquid crystal display), OLED, and TFT (thin film transistor) displays. The display may additionally be based on a panel mounted display, a HUD projection, or any known technology. In an exemplary embodiment, display element 104 includes a panel display. To provide a more complete description of the method that is implemented by the display system 100, a general description of the display device 118 and its layout will now be provided.

Figure 2:
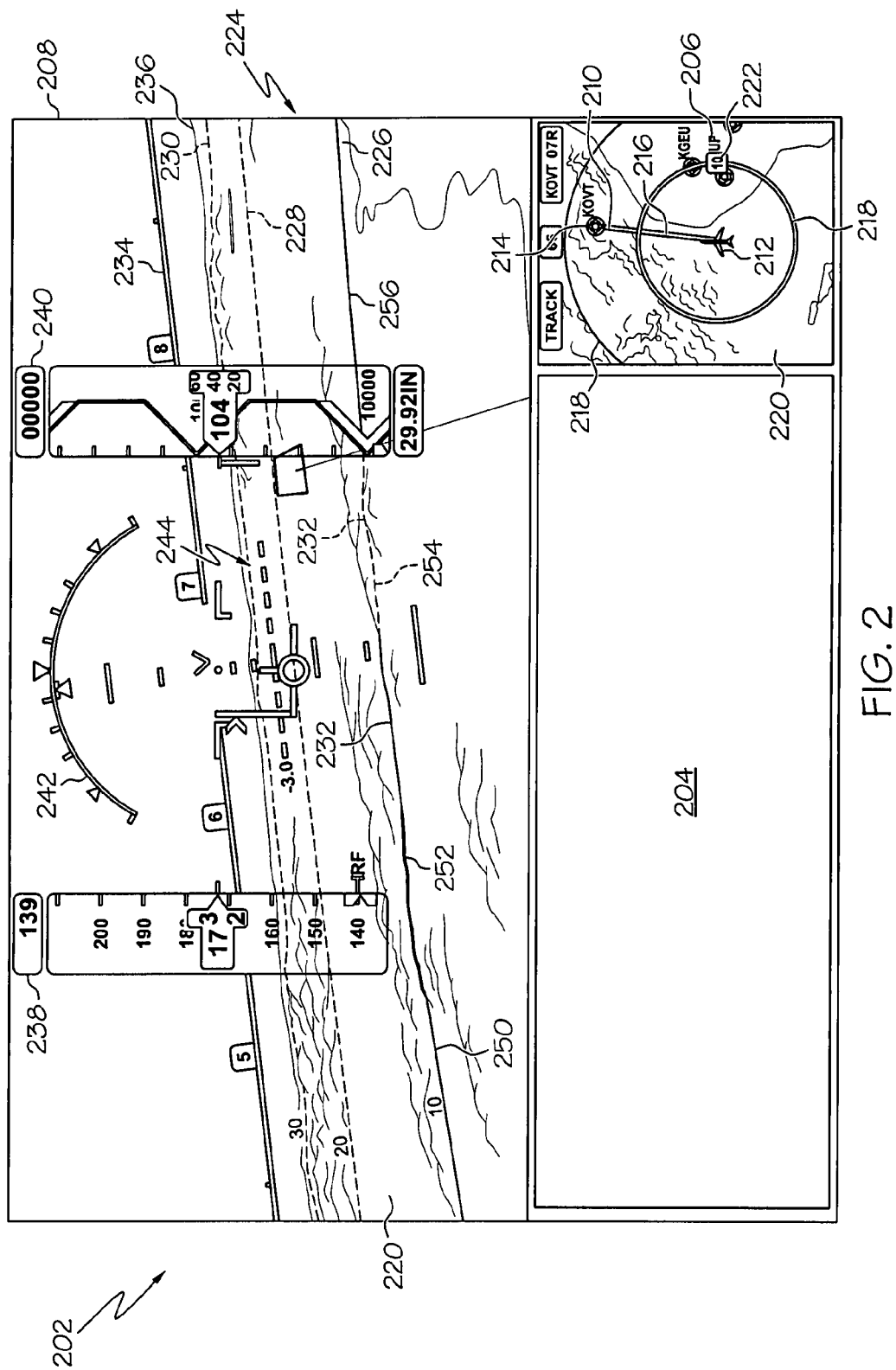
FIG. 2 is a simplified representation of an exemplary display screen that may be used in the system of FIG. 1, which shows the overall layout of the display screen, and on which is various graphical and textual images are simultaneously displayed.

With reference to FIG. 2, the display device 118 includes a display area 202 in which multiple graphical and textual images may be simultaneously displayed, preferably in different sections of the display area 202. For example, general flight-related data 204, a lateral situation display 206, and a perspective view display 208 may be displayed simultaneously, alone, or in various combinations, in various sections of the display area 202. The general flight-related data 204 may include various types of data related to the flight plan of the aircraft. Such data includes, but is not limited to, the flight identifier, route iteration number, and a waypoint list and associated information, such as bearing and time to arrive. The general flight-related data 204 may additionally include various types of data associated with various types of flight hazards. Examples of these, and other types of data that may be displayed, are disclosed in U.S. Pat. No. 6,289,277, entitled "Interfaces for Planning Vehicle Routes," which is assigned to the assignee of the present application, and the entirety of which is hereby incorporated by reference. As discussed below and referenced above, the perspective view display 208, the lateral situation display 206, and a vertical display (not shown) can display information based on data from a number of sources, including the terrain sensor 130, the terrain database 106, a combination of the terrain sensor 130 and terrain database 106, as well as the other information sources discussed above.

The lateral situation display 206 includes a top-view aircraft symbol 212, and at least portion of a flight plan 210 represented by one or more waypoint symbols 214 and interconnecting line segments 216, and one or more range rings 218. The lateral situation display 206 also preferably includes various map features including, but not limited to, a lateral two-dimensional view of terrain 220 below the flight plan, political boundaries, and navigation aids. The range rings 218 may be used to indicate sequential ranges, such as fixed distance or time ranges needed to travel from the top-view aircraft symbol 212 to another position on the terrain 220, or any other information that may be useful to a pilot. In the illustrated embodiment, the range rings 218 indicate distances from the aircraft symbol 212. The range ring 218 includes a range indicator 222, which displays the lateral distance from the aircraft's present position to the position on the lateral map 202 that corresponds to the range ring 218 (e.g., 10 nautical miles). The value of the range indicator 222 may be set manually or automatically, via a non-illustrated pop-up menu.

The perspective view display 208 also provides a view of the terrain 220, including, for example, a terrain profile that is determined by elevations of the terrain. The perspective view display 208 may provide the view of the terrain 220 below the flight plan and/or ahead of the aircraft, and may show the terrain 220 and various other symbols and/or data (discussed further below) as either a two-dimensional profile vertical situation view or a perspective situation view. In the depicted embodiment, the terrain 220 is displayed ahead of the aircraft and is shown as a three-dimensional perspective view 224. The lateral situation display 206 and the perspective view display 208 can use the same scale so that the pilot can easily orient the present aircraft position to either section of the display area 202. The processor 104 may implement any one of numerous types of image rendering methods to process terrain data from the terrain database 106 and render the three-dimensional perspective view 224. One such exemplary method is disclosed in U.S. Pat. No. 6,862,501, entitled "Method for Producing 3D Perspective View Avionics Terrain Displays," which is assigned to the assignee of the present invention, and the entirety of which is hereby incorporated by reference.

In addition to displaying the three-dimensional perspective view 224 of the terrain 220, the perspective view display 208 may also simultaneously display terrain-tracing lines 226, 228, 230. In one exemplary embodiment, the terrain-tracing lines 226, 228, 230 correspond with the range rings 218 shown in the lateral situation display 206. Preferably, the terrain-tracing lines 226, 228, 230 selectively appear on the perspective view display 208 as either representing ground-referenced or aircraft-referenced sequential ranges.

Terrain-tracing lines 226, 228, 230 that are ground-referenced are fixed to a location on the terrain 220. In such case, the terrain-tracing lines 226, 228, 230 may be spatially positioned and may represent distances from the aircraft to a destination depicted on the terrain 220, and the spatial position is determined by the current position of the aircraft. Alternatively, the terrain-tracing lines may represent an estimated time of arrival to an object on the terrain 220 or an amount of time needed to reach an object depicted in the terrain 220. Terrain-tracing lines 226, 228, 230 that are vehicle- or aircraft-referenced indicate a fixed range away from the vehicle. In the embodiment depicted in FIG. 2, the terrain-tracing lines 226, 228, 230 represent 10 nautical miles, 20 nautical miles, and 30 nautical miles, respectively, from the aircraft. Alternatively, these types of terrain-tracing lines 226, 228, 230 may represent an estimated time of arrival to an object on the terrain 220 or an amount of time needed to reach an object depicted in the terrain 220. As a further alternative, the terrain tracing lines may represent a distance or time from any first point to any second point, such as a landing strip.

The terrain-tracing lines 226, 228, 230 may be any line or shape configuration, including, but not limited to, solid, thick, thin, dashed, opaque, semi-transparent, shading, surface shape, or colored, or combinations thereof. The particular configuration of the lines 226, 228, 230 may represent a particular range of the sequential ranges. Each of the terrain-tracing lines 226, 228, 230 may comprise multiple segments 250, 252, 254, 256 that have similar or different configurations. For example, a terrain-tracing line may have a segment 250 that appears lighter, more transparent, or thinner than another segment 252 of the line. In one exemplary embodiment, the variously configured segments are used to reduce visual clutter of the display 208. In this regard, a segment that extends in front of an object can appear to be invisible, while other segments may be visible. In another exemplary embodiment, one line segment is a first configuration or color that represents safe areas and another line segment is a second configuration or color that indicates potential terrain hazards.

Preferably, the terrain-tracing lines 226, 228, 230 extend at least partially across the perspective view display 208 conforming to the terrain profile. In another embodiment, lines are displayed that do not conform to the terrain profile. In one exemplary embodiment, the terrain-tracing lines 226, 228, 230 change as the aircraft moves. For example, the terrain-tracing lines 226, 228, 230 trace the contour of the terrain 220 and may appear to have curves. As shown in FIG. 2, the terrain 220 may include elevated objects 232, such as hills, and the terrain-tracing lines 226, 228, 230 preferably outline the elevated object 232. The terrain tracing lines 226, 228, 230 can be displayed at a height that is dynamically determined and/or adjustable based on the elevation of the terrain and/or the application. Alternatively, in areas in which the terrain 220 does not have contours, such as in areas having ocean or flat terrains, the terrain-tracing lines 226, 228, 230 appear to be straight lines. Thus, the terrain-tracing lines 226, 228, 230 may have any suitable shape. Although the terrain-tracing lines 226, 228, 230 are depicted as flush with the terrain 220, the terrain-tracing lines 226, 228, 230 may alternatively be slightly elevated a predetermined distance above the terrain 220. The terrain-tracing lines 226, 228, 230 may be dynamic so that they conform to the terrain 220 profile as the aircraft moves. Thus, every point of the terrain-tracing lines 226, 228, 230 changes as the terrain profile changes.

Additionally, it will be appreciated that the terrain-tracing lines 226, 228, 230 may be continuously displayed on the perspective view display 208 during operation. Alternatively, the terrain-tracing lines 226, 228, 230 may be displayed automatically upon the arrival of an event, such as upon the approach of potential threat terrain determined from the TAWS data, or upon the arrival at a user-selected point of interest, such as a landmark, building, or structure of interest.

The perspective view display 208 may also include conventional primary flight display symbology. In particular, the navigation data may include information such as vehicle and heading data and the display may further include range lines representative of the vehicle attitude and heading data. For example, as shown in FIG. 2, the display 208 may include a heading indicator line 234 that extends across the display 208. Preferably, the heading indicator line 234 is depicted slightly above the horizon 236 and has a configuration that is different than the configuration of the terrain-tracing lines 226, 228, 230. The display 208 may also include other conventional symbology, including, but not limited to, an air speed tape 238, an altitude tape 240, a bank indicator 242, and a compass 244.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:
1. A display system for a vehicle, comprising:
a navigation database storing navigation data;
a terrain sensor configured to gather terrain data;
a processor adapted to receive the navigation data and the terrain data and operable to supply one or more image rendering display commands based upon the navigation data and the terrain data; and
a display device coupled to receive the image rendering display commands and operable, in response thereto, to render (i) a perspective view image representative of the terrain data and the navigation data and including terrain and (ii) at least one line on the perspective view image that extends at least partially across the terrain and represents at least one of a ground-referenced range to a fixed location on the terrain and a vehicle-referenced range from the vehicle to a fixed range away from the vehicle,
wherein the processor is configured to selectively display at least one of the ground-referenced range and the vehicle-referenced range.

2. The system of claim 1, further comprising a terrain database configured to receive and store the terrain data from the terrain sensor and to provide the terrain data to the processor.

3. The system of claim 1, further comprising a terrain database storing additional data related to the terrain, the processor configured to receive the data from the terrain database and to supply the one or more image rendering display commands based thereon.

4. The system of claim 3, wherein the additional data from the terrain database is pre-loaded data.

5. The system of claim 3, wherein the additional data from the terrain database is a first type of data and the terrain data from the terrain sensor is a second type of data.

6. The system of claim 3, wherein the processor is configured to selectively receive the additional data from the terrain database and the terrain data from the terrain sensor.

7. The system of claim 1, wherein the terrain sensor is a radar-type sensor.

8. The system of claim 1, wherein the terrain has a profile that is determined by elevations of the terrain, and wherein the line conforms with the terrain profile.

9. The system of claim 8, wherein the line is a surface shape.

10. The system of claim 8, wherein at least one of the ground-referenced range and the vehicle-referenced range is an estimated time of arrival at a point on the terrain.

11. The system of claim 8, wherein at least one of the ground-referenced range and the vehicle-referenced range is an amount of time needed to travel from the vehicle to a point on the terrain.

12. The system of claim 8, wherein the line appears on the image upon an occurrence of an event.

13. The system of claim 8, wherein the line is a first line and the display device is further configured to render a second line on the perspective view image, the first line having a first line configuration and the second line having a second line configuration.

14. The system of claim 13, wherein the first and second lines each represent sequential, different fixed ranges.

15. The system of claim 1, wherein the processor is configured to receive vehicle attitude and heading data and the display device is configured to render additional lines representative of the vehicle attitude and heading data.

16. The system of claim 1, wherein the line is displayed flush with the terrain.

17. The system of claim 1, wherein the line is displayed at a predetermined height above the terrain.

18. The system of claim 1, wherein the line is dynamically displayed at a height based on an elevation of the terrain.

19. A display system for a vehicle, comprising:
a processor adapted to receive terrain data from a terrain sensor and navigation data from a navigation database, and operable, in response thereto, to supply one or more image rendering display commands; and
a display device coupled to receive the image rendering display commands and operable, in response thereto, to simultaneously render (i) a perspective view image representative of the terrain data and the navigation data and (ii) one or more terrain-tracing lines or surface shapes,
wherein the perspective view image includes terrain having a profile that is determined by elevations of the terrain,
wherein each terrain-tracing line or surface shape (i) extends at least partially across the terrain, (ii) represents a range from the vehicle to a location on the terrain, (iii) conforms with the terrain profile, (iv) has a configuration that is at least one of solid, dashed, opaque, semi-transparent, thick, thin, shaded, and colored, and (v) comprises a first segment and a second segment, and wherein the first segment has a first configuration and the second segment has a second configuration.

20. A method of displaying terrain on an aircraft flight deck display system, the method comprising the steps of:

gathering terrain data with a terrain sensor;

processing the terrain data;

processing navigation data from a navigation database; and simultaneously displaying (i) a three-dimensional perspective view image representative of the terrain data and navigation data and (ii) at least one range line, wherein the perspective view image includes the image terrain having a profile determined by elevations of the terrain, wherein the range line (i) extends at least partially across the terrain, and (ii) represents at least one of a ground-referenced range to a fixed location on the terrain and a vehicle-referenced range from the vehicle to a fixed range away from the vehicle; and selectively displaying at least one of the ground-referenced range and the vehicle-referenced range.

* * * * *